US011770506B2

(12) United States Patent
Kerst et al.

(10) Patent No.: US 11,770,506 B2
(45) Date of Patent: Sep. 26, 2023

(54) MULTI-SOURCE 3-DIMENSIONAL DETECTION AND TRACKING

(71) Applicant: Innovative Signal Analysis, Inc., Richardson, TX (US)

(72) Inventors: Julia Florence Kerst, Richardson, TX (US); Thomas Nicholas Zogakis, Richardson, TX (US); Rachel Ann Rivera, Murphy, TX (US); Michael Wade Martin, Royse City, TX (US); Joseph Evan Harris, Carrollton, TX (US); Adam Earl Scott, Carrollton, TX (US); Jonathan Edward Ray, Murphy, TX (US)

(73) Assignee: Innovative Signal Analysis, Inc., Richardson, TX (US)

( * ) Notice: Subject to any disclaimer, the term of this patent is extended or adjusted under 35 U.S.C. 154(b) by 0 days.

(21) Appl. No.: 17/304,699

(22) Filed: Jun. 24, 2021

(65) Prior Publication Data

US 2021/0409655 A1 Dec. 30, 2021

Related U.S. Application Data

(60) Provisional application No. 63/044,213, filed on Jun. 25, 2020.

(51) Int. Cl.
*H04N 7/18* (2006.01)

(52) U.S. Cl.
CPC ............. *H04N 7/188* (2013.01); *H04N 7/181* (2013.01)

(58) Field of Classification Search
CPC ........ H04N 7/188; H04N 7/181; G06T 7/292; G06T 2207/10016; G06T 2207/30232;
(Continued)

(56) References Cited

U.S. PATENT DOCUMENTS

| | | | | | |
|---|---|---|---|---|---|
| 2008/0166015 | A1* | 7/2008 | Haering | H04N 7/181 | 382/103 |
| 2011/0115909 | A1* | 5/2011 | Sternberg | G06T 7/292 | 348/143 |

(Continued)

OTHER PUBLICATIONS

International Search Report and Written Opinion for International Patent Application No. PCT/US2021/038936, dated Apr. 28, 2022, 11 pages.

(Continued)

*Primary Examiner* — Jared Walker
(74) *Attorney, Agent, or Firm* — Christopher R. Christenson; Kelly, Holt & Christenson, P.L.L.C

(57) ABSTRACT

An object detection system includes a first camera having a first field of view and a second camera having a second field of view that overlaps with the first field of view. The object detection system includes object detection logic configured to receive a first image from the first camera and a second image from the second camera and identify an object in both the first and second image. The object detection system further includes object mapping logic configured to identify a location of the object based on the first and second image. The object detection system also includes display logic configured to display the location of the object.

19 Claims, 14 Drawing Sheets

(58) Field of Classification Search
CPC .. G06T 2207/30241; G06T 7/593; G06T 7/73
See application file for complete search history.

(56) References Cited

U.S. PATENT DOCUMENTS

| | | | | |
|---|---|---|---|---|
| 2011/0241902 | A1 | 10/2011 | Shavit | |
| 2015/0078652 | A1* | 3/2015 | Olofsson | G06V 20/00<br>382/154 |
| 2018/0350095 | A1* | 12/2018 | Kay | H04N 13/239 |
| 2019/0068953 | A1* | 2/2019 | Choi | B64C 39/024 |
| 2019/0287272 | A1* | 9/2019 | Wu | H04N 5/2354 |
| 2020/0008024 | A1* | 1/2020 | Hu | H04W 4/025 |
| 2020/0167956 | A1* | 5/2020 | Herman | G06T 7/73 |

OTHER PUBLICATIONS

First Examination Report for Australian Patent App# 2021351611, dated Jun. 26, 2023, 3 pages.

* cited by examiner

FIG. 10B
Target Detail
View Tools
Location: 32.70411 -117.22648
ID: 5617
2010
Bearing: 102.2
Range (m): 2147.708
Speed (mph): 5.2
Alert Region:
Camera 1
2002
Camera 2
2002
Thu Jun 17 10:11:58 2021
2000

MULTI-SOURCE 3-DIMENSIONAL DETECTION AND TRACKING

CROSS-REFERENCE TO RELATED APPLICATION

The present application is based on and claims the benefit of U.S. Provisional Patent Application Ser. No. 63/044,213 filed on Jun. 25, 2020, the content of which is hereby incorporated by reference in its entirety.

BACKGROUND

In many surveillance operations, a moving object is detected and a search patrol is dispatched to investigate. For example, an oil installation may use radar, lidar, or other active signal-emitting scanning devices to detect that an object is moving. In another example, border patrol agents may detect movement along an international border and wish to send a patrol to intercept a potential smuggler. Current radar-camera systems, however, require confirmation of a potential moving object prior to dispatching a team, as radar alone can give false positives.

SUMMARY

An object detection system includes a first camera having a first field of view and a second camera having a second field of view that overlaps with the first field of view. The object detection system includes object detection logic configured to receive a first image from the first camera and a second image from the second camera and identify an object in both the first and second image. The object detection system further includes object mapping logic configured to identify a location of the object based on the first and second image. The object detection system also includes display logic configured to display the location of the object.

DETAILED DESCRIPTION OF ILLUSTRATIVE EMBODIMENTS

Figure 1A:
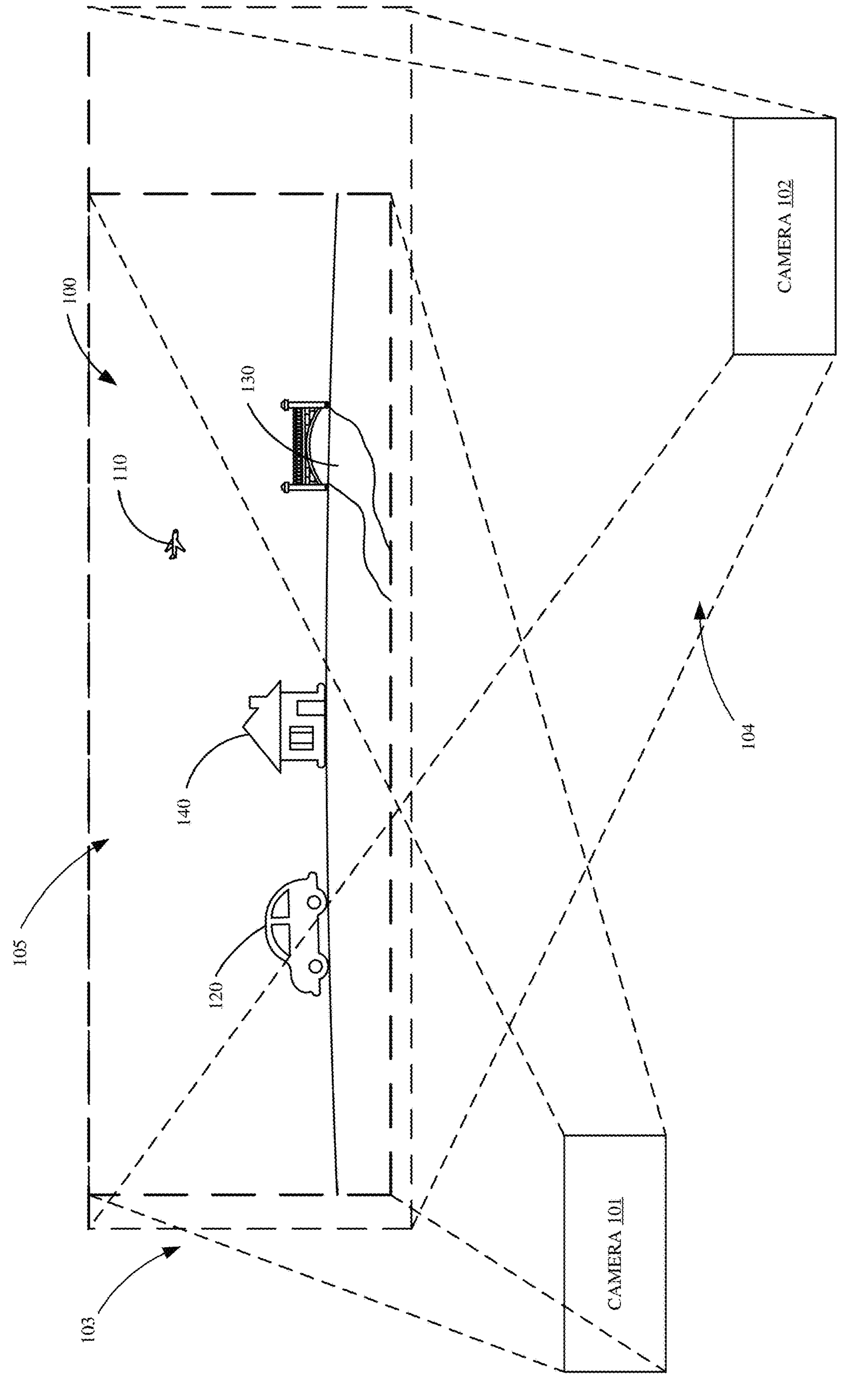
FIGS. 1A-1B illustrate a perspective view showing an example environment in which embodiments of the present invention may be particularly useful.

As set forth above, many current surveillance systems rely on radar, lidar or other active scanning devices that emit a signal that may be identified by a target object. For example, these scanning devices may be used to direct a security patrol agent or incident responder to a detected object of interest. In another example, surveillance systems for the detection of an unmanned aerial vehicle (UAV) often rely on radar or lidar scanning devices in order to determine whether the UAV has violated restricted air space. One issue with these tracking systems is that they rely on the target object to transmit a signal to be detected. Further, these tracking systems subsequently emit a signal, revealing to the target that the area is under surveillance. Moreover, these approaches have no means to confirm whether the detection is a target of interest, or to geolocate the object if it is a target of interest. Accordingly, a system that does not emit a signal nor rely on the transmission of a signal being emitted by a target object is desired. As further detailed below, one such system includes the use of overlapping broad-range video cameras. The cameras may be, for example, the image acquisition system provided in U.S. Pat. No. 8,072,482, filed on Nov. 2, 2007, the contents of which are hereby incorporated by reference. The system can be implemented in a variety of applications, such as detecting and geolocating surface objects, airborne objects, underwater objects, space objects, etc.

At least some embodiments described herein consist of one or more broad-range video cameras and associated electronics configured to detect motion within a wide field of view, map the detected motion to a latitude and longitude (or other desired mapping configuration) and provide an indication of the detected geolocation to a user. However, while several embodiments are described with respect to broad-range video cameras, it is expressly contemplated that at least some embodiments and systems described herein can be utilized with other camera types.

Broad-range video cameras are known to provide 2D information within a camera image about items of interest. It is desired to translate the detected 2D information from two cameras with an overlapping field of view into a real-world location of an item of interest. Positional information can then be provided, for example, in a map-based view, to an interested individual.

Broad-range video cameras present several benefits over other camera systems, such as pan/tilt systems, for example, when used in a wide area surveillance operation. In one embodiment, broad-range video cameras, because of their wide field of view (for example, up to 90°, up to 180°, or even up to 360°), do not need to pan in order to survey a scene and update an image feed. In this way, the entire area of interest may be surveyed. Once calibrated, a broad-range video camera system can provide a geographical output for a directed moving object within a field of view. The geographical output may include, for example, an azimuth and elevation angle for a directed object within a field of view.

Figure 1B:
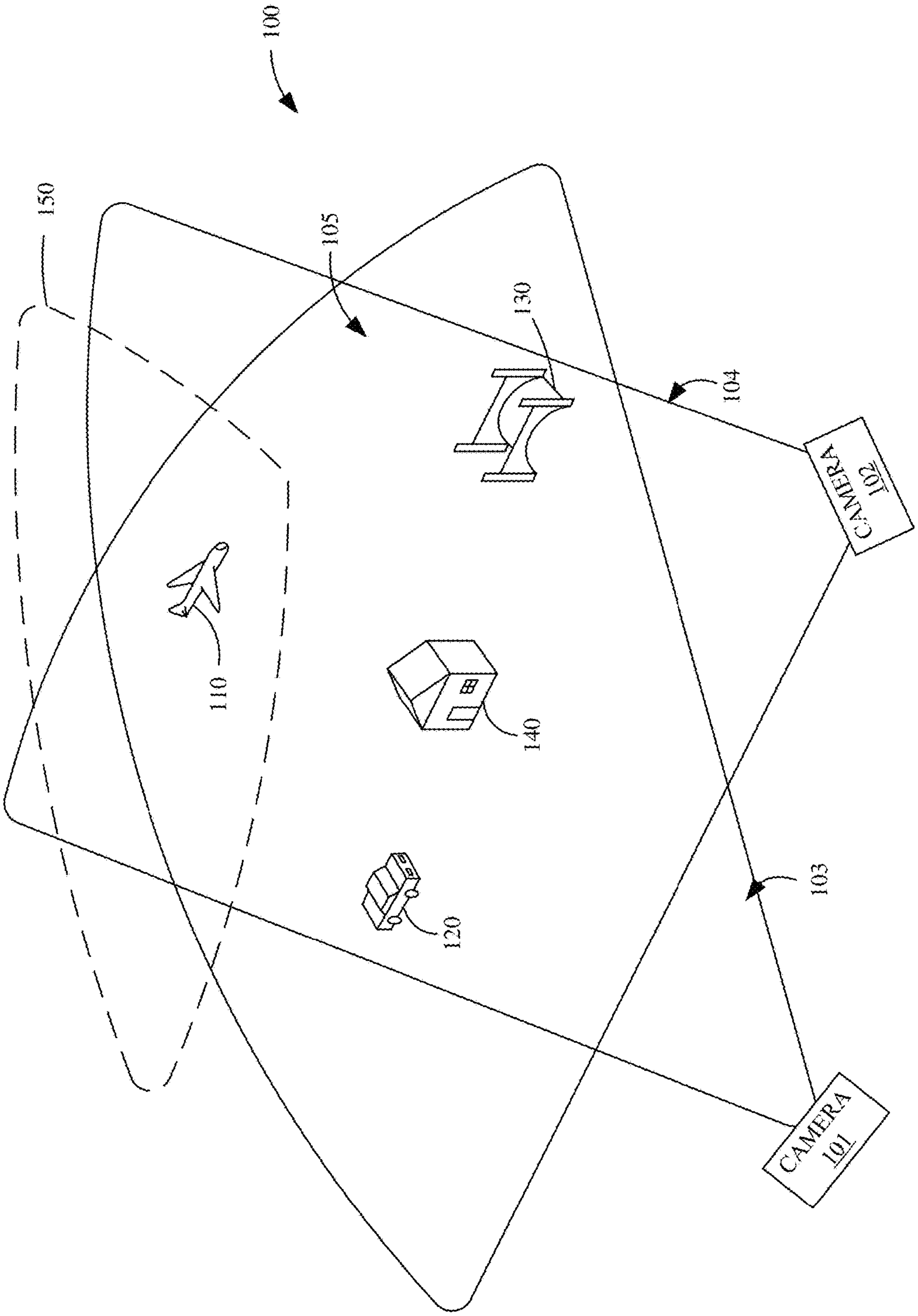

FIGS. 1A-1B illustrate a perspective view showing an example environment in which embodiments of the present invention may be particularly useful. FIG. 1B bears some similarities to FIG. 1A and like components are numbered similarly. As illustrated, FIG. 1A generally includes environment 100 being surveyed by a first camera 101 and a second camera 102. Camera 101 and camera 102 each have their own respective fields of view of environment 100, indicated respectively at reference numerals 103 and 104, and are configured to survey environment 100 based on their respective field of views 103 and 104. For example, in one embodiment, camera 101 and camera 102 are broad-range video cameras and have wide area field of views 103 and 104, which are able to see a greater distance across a horizon without panning and/or tilting. However, in another embodiment, camera 101 and camera 102 are a pan/tilt camera, visible light spectrum camera, thermal camera, motion activated camera, or other suitable camera arrangement capable of viewing environment 100. Additionally, camera 101 and camera 102 may have different sized field of views, as illustrated in FIG. 1A. However, in other embodiments, cameras 101 and 102 may have the same sized field of view. As shown, Camera 101 and camera 102 share an overlapping field of view 105. In this example, overlapping field of view 105 is illustrated as a single two-dimensional plane to represent the overlapping images of the cameras (the images of which are two-dimensional). However, this is for illustrative purposes only as the images provided from each camera may each present a different image of the same area from a different perspective. Further, while FIG. 1A illustrates the use of two cameras 101 and 102, it is expressly contemplated that more than two cameras with an overlapping field of view can also be used.

As indicated in FIG. 1A, there are a plurality of objects in environment 100 and within overlapping field of view 105. Specifically, environment 100 may include moving objects 110 and 120, landmark 130, and structure 140. For example, moving object 110 is illustrated in FIG. 1A as a drone and moving object 120 is illustrated as a vehicle. However, in other examples, moving objects 110 and 120 may be another movable object capable of detection. Physical landmarks, such as landmark 130 (illustrated as a river), as well as manmade landmarks, such as structure 140 (illustrated as a house), may also be visible within overlapping field of view 105.

It may be desired to determine a geographical location (geolocation) of a moving object, such as moving object 110. The geolocation may include, for example, latitude, longitude, and/or elevation/altitude. However, it is expressly contemplated that other locational coordinates may be determined as well. While camera 101 and 102 can see moving object 120, and perhaps provide an indication of direction, it is desired to translate that indication of direction into a latitude, longitude, and elevation/altitude, for example, that a patrol can be dispatched to. Directions can comprise, for example, direction from a currently known patrol location, or, alternatively, from a known location of camera 101 and/or camera 102 or from another location entirely.

The objects within overlapping field of view 105 can be geolocated based on known information of camera 101 and camera 102 and their locations in the images captured by camera 101 and camera 102. Geolocation, in one embodiment, comprises a latitude, a longitude, and elevation/altitude for a target object. The calibrated camera systems 101 and 102 can responsively provide a geographical output for a target object within overlapping field of view 105. In some examples, an object of interest within overlapping field of view 105, such as moving object 110 and/or moving object 120, can be identified based on image change detection; that is, a pixel change from sequentially captured images which is indicative of a moving object in the camera's field of view. Alternatively, or additionally, a stationary object such as landmark 130 and/or structure 140, or a substantially motionless object such as a parked car 120 or a hovering drone 110 can be detected based on their optical characteristics. For instance, a machine learning algorithm can be trained to identify a number of objects based on their optical characteristics without movement. Optical characteristics can include, for example, reflection, polarization, and/or refraction. Of course, these are examples only and other methods of detection may be used as well.

In one embodiment, a map and/or map image is obtained, for example from a map repository or a map generation unit such as the Google Maps service (available from Google LLC, with headquarters in Mountain View, Calif. 94043), or another suitable mapping service. The retrieval of a map can be accomplished automatically using a map retrieval algorithm, for example, based on a known location of camera 101 and/or camera 102, and based on an indication that a moving object has been detected within the overlapping field of view 105. The retrieved map can be of any suitable size, shape, resolution, etc., depending on the area of interest. In one embodiment, a mapped image centered on one or more camera installation is retrieved, extending at least five miles in all directions. However, other sizes of maps may also be suitable, in one embodiment a one-mile radius map is retrieved. In another embodiment, a ten-mile like radius map is retrieved.

FIG. 1B illustrates another perspective view showing an example environment in which embodiments of the present invention may be particularly useful. As shown, camera 101 and camera 102 each have a respective field of view 103 and 104 with an overlapping field of view 105. Objects 110, 120, 130 and 140 are shown within overlapping field of view 105. In this view, the horizontal displacement or distance of objects from camera 101 and camera 102 can be observed. In the illustrated example, camera 101 and camera 102 are monitoring a restricted flying zone 150. As shown, in one example, moving object 110 is located within a restricted flying zone 150 and within overlapping field of view 105. Moving object 110 being within overlapping field of view 105 allows for it to be geolocated based on the pixel changes from sequentially captured images from camera 101 and camera 102, indicative of moving object 110 within overlapping field of view 105. Geolocation can include, in one example, a latitude, a longitude, and elevation/altitude for moving object 110. Additionally, based upon the detection and geolocation of moving object 110 being in restricted flying zone 105, an alarm can be triggered to a user of the surveillance system. In some examples, the alarm can include audible, visual and/or haptic stimuli.

Figure 2:
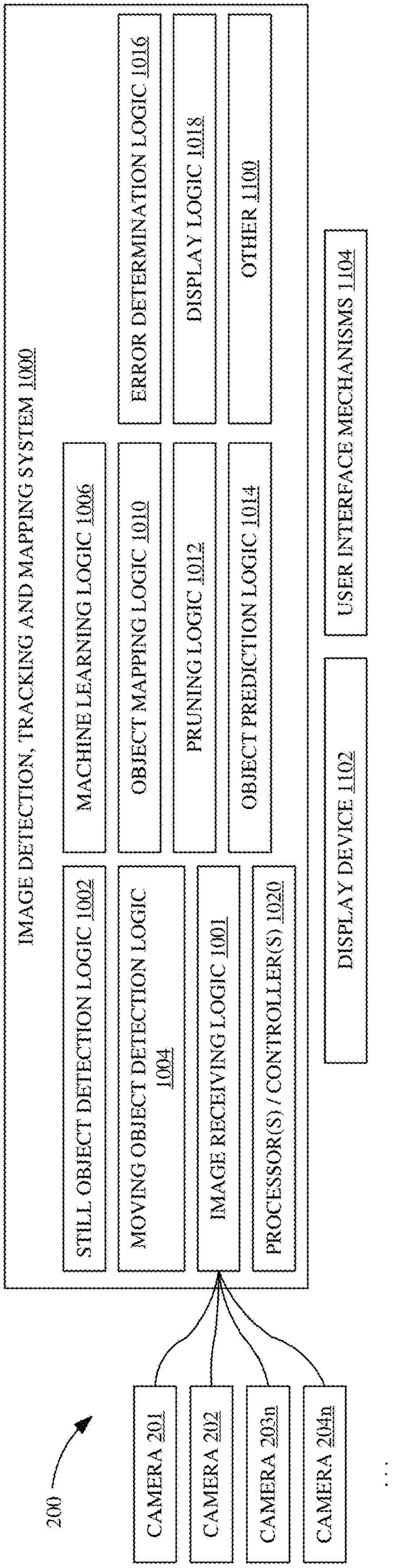
FIG. 2 is a block diagram showing an example environment with which embodiments of the present invention are particularly applicable.

FIG. 2 is a block diagram showing an example environment with which embodiments of the present invention are particularly applicable. As shown, environment 200 includes camera 201 and camera 202. However, there may optionally be additional cameras as indicated by camera blocks 203*n* and 204*n*. Cameras 203*n* and 204*n* may each be one camera, a plurality of cameras, or removed altogether, as indicated by n. Additionally, cameras 203*n* and 204*n* may be the same type of camera as camera 201 and/or camera 202 or may be a different type of camera. In one embodiment, cameras 201, 202, 203*n*, and 204*n* are broad-range video cameras. However, in another embodiment, cameras 201 and 202 are broad-range video cameras and cameras 203*n* and 204*n* are pan/tilt cameras.

In environment 200, these cameras provide a geographical output of a surveillance scene to image receiving logic 1001 of image detection, tracking and mapping system 1000. The geographic output may be, for example, a plurality of images, where image receiving logic 1001 receives and completes processing on the images. Processing may include, for example, cropping data from the images that contain no overlapping data with another image. Alternatively, or additionally, processing may include rotating the images to a desired viewpoint. In another example, image receiving logic 1001 completes some image processing operations on the image such as white balancing, sharpening, etc. Following processing, Image receiving logic 1001 feeds the images to still object detection logic 1002 and moving object detection logic 1004 for object detection within the images.

Still object detection logic 1002 detects objects that are not in motion within the images. In one example, still object detection logic 1002 utilizes machine learning logic 1006 to detect still or substantially motionless objects within the images. Machine learning logic 1006 can be trained on a set of data to recognize various objects that may be within an image (e.g., a person, a drone, a vehicle, etc.). In some examples, still object detection logic 1002 receives user input that assists in identifying an object. User input can include, for example, a dataset, descriptor, etc. Further, still object detection logic 1002, in some examples, can identify the type of the object (e.g., a bird, a plane, a landmark, a vehicle, etc.).

Moving object detection logic 1004 receives images from one or more of the cameras 201, 202, 203*n*, 204*n* over time and detects changes in the images from one image to the next. In one embodiment, changes in the images are detected from moving object detection logic 1004 by pixel changes from sequentially captured images, indicative of a moving object in the two or more camera's overlapping field of view. The pixelated changes in the image(s) can be determined to be a moving object moving through the overlapping field of view of the various cameras. Additionally, the pixelated changes in the image(s) can be used to estimate the moving object's velocity, when applicable. In some examples, moving object detection logic 1004 receives user input that assists in identifying an object. User input can include, for example, a dataset, descriptor, etc. In another example, moving object detection logic 1004 utilizes machine learning logic 1006 to detect moving objects within the image. Further, moving object detection logic 1004, in some examples, can identify the type of the object (e.g., a moving bird, plane, drone, etc.).

Image detection, tracking and mapping system 1000 further includes object mapping logic 1010, which is configured to determine the location of the objects identified by still object detection logic 1002 and moving object detection logic 1004. Object mapping logic 1010 can determine the location of the objects in various ways. For instance, object mapping logic 1010 can receive calibration information relative to cameras 201, 202, 203*n*, 204*n* and identify each pixel as an angular and/or distal location relative to the camera(s). Thus, the detected pixel change and pixel location of the object in the image (or sets of images from multiple cameras) can be converted into a geolocation (e.g., latitude, longitude, altitude/elevation, etc.) of the object. Based on the size of the object in the image or the overlapping of multiple geolocation estimations from the different cameras, the absolute geolocation of the object can be determined.

Error determination logic 1016 works in conjunction with object mapping logic 1010 to determine a margin of error or estimated area of error. When determining the location of an object via optical analysis, there may be some ambiguity or margin of error of the object's absolute geolocation. As further detailed below, the margin of error is typically an elliptical shape. This ambiguity or margin of error can be caused by a number of factors, such as pixel pitch, ground sample distance, calibration bearing and depression angle uncertainty, camera sway, optical distortions, resolution/pixel limits, etc. Adding more cameras to a system can reduce the amount of ambiguity or increase the certainty of the objects true location. Error determination logic 1016 is configured to determine the estimated area of error based on the received images and geolocation estimations.

Pruning logic 1012 can optionally prune objects that are not of interest. For example, objects that are known to be present in the fields of view of the various cameras may be ignored and be removed from tracking. Alternatively, or additionally, pruning can include discarding objects in the environment that do not meet a certain predetermined criterion. Depending on the application of the system, a stationary and/or moving object that is not in a region of interest or overlapping field of view can be pruned. For instance, if the system is being used to monitor air traffic, then surface/ground objects can be pruned out. In another example, if the system is being used to monitor vehicular traffic, then objects smaller than cars can be pruned out.

Image detection, tracking and mapping system 1000 additionally includes object prediction logic 1014. Object prediction logic 1014 is configured to predict the future locations/conditions of some objects. For instance, object prediction logic 1014 receives the object geolocation from object mapping logic 1010 and the velocity of the object from moving object detection logic 1004 and predicts future locations of the target moving object. Object prediction logic 1014 can predict the future locations of objects in other ways as well. For instance, the object's past locations can be used to determine a future location. Or for instance, by recognizing which way an object is facing, object prediction logic 1014 can predict the object will move in the direction that the object is facing.

Display logic 1018 receives data from various components of image detection mapping system 1000 and displays interfaces on a display device 1102. Of course, image detection mapping system 1000 may include one or more processor(s)/controller(s) as indicated by block 1020, as well as other items indicated by block 1100. Display device 1102 can include LCDs, LEDs or other display devices such as touchscreens, etc. that can display images or interfaces to a user. User interface mechanisms 1104 can include a variety of user interface devices that allow a user to interact with image detection mapping system 1000. User interface mechanisms 1104 can include buttons, keyboards, a mouse, a trackball, a touchpad, a touch screen, etc.

Figure 3:
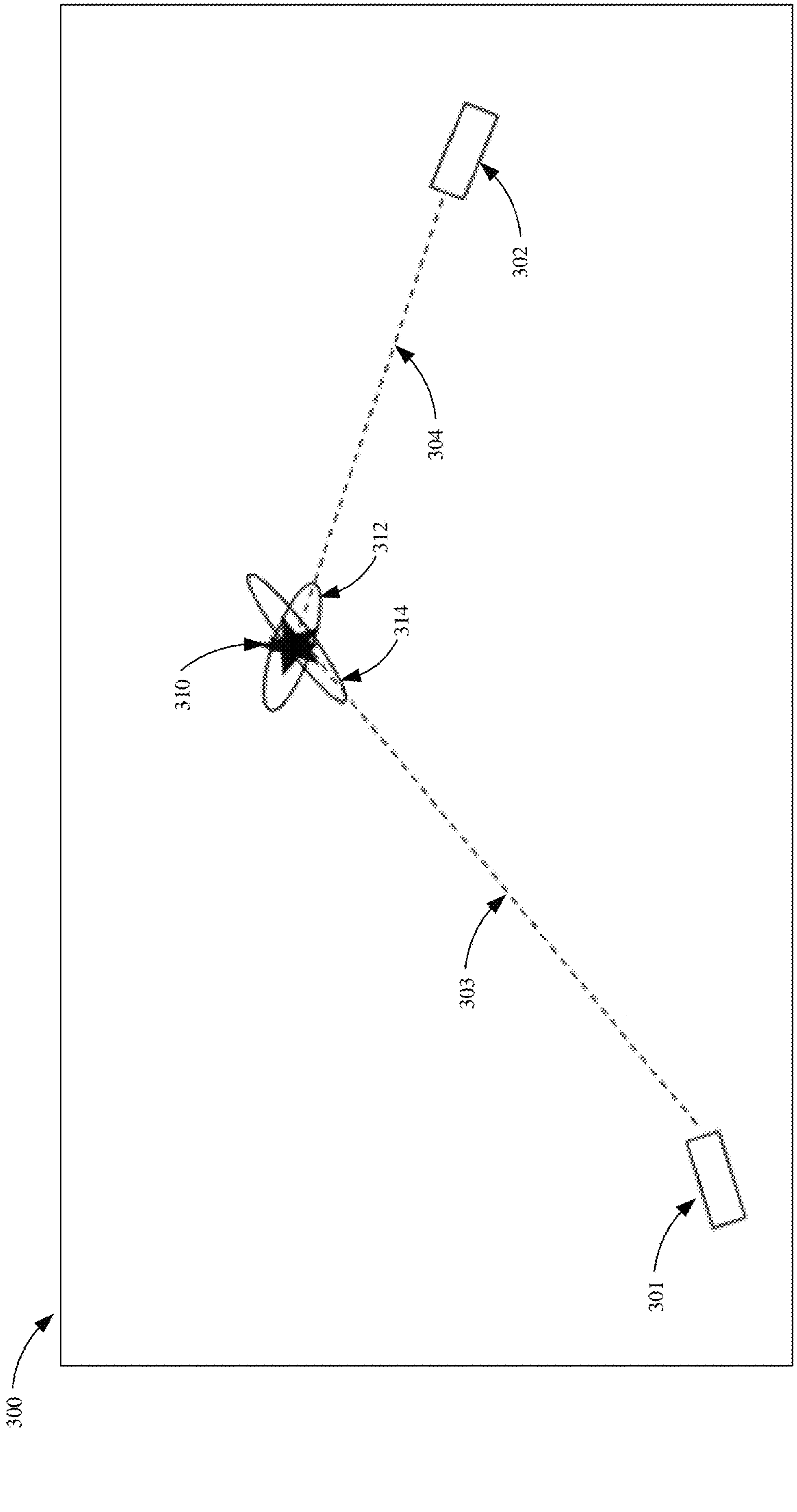
FIG. 3 is a plan view of two cameras oriented towards an object in accordance with an embodiment of the present invention.

FIG. 3 is a plan view of two cameras oriented towards an object in accordance with an embodiment of the present invention. As illustrated, environment 300 includes camera 301 and camera 302, which are pointed at detected object 310 at, respectively, angle of arrival 303 and 304. Angle of arrivals 303 and 304 may each include, for example, an azimuth angle and an elevation angle. Angle of arrivals 303 and 304 may be at the same or different angle degree based on the positions of camera 301 and camera 302. Detected object 310 may have its geolocation estimated via the images provided by camera 301 camera 302 being processed by, for example, image detection, tracking and mapping system 1000 described above with respect to FIG. 2. As shown, detected object geolocation estimate 310 is roughly within the center of the intersection of error ellipses 312 and 314. Error ellipses 312 and 314 may be produced by, for example, error determination logic 1016, discussed above. The number of error ellipses are directly correlated to the number of cameras present within the surveillance environment. For example, as shown in FIG. 3, there are two error ellipses 312 and 314 based on the presence of cameras 301 and 302. Of course, incorporating more cameras into the surveillance system will result in the formation of more error ellipses, and thus reduce the amount of ambiguity and/or increase the certainty of the absolute geolocation of detected object 310. Additionally, in one embodiment, environment 300 may be displayed as an interface to a user. When displayed to a user, the interface may account for the error when navigating a user to detected object 310 (e.g., display the margin of error). In one example, this diagram is an interface displayed on display device 1102 to a user via display logic 1018.

Figure 4:
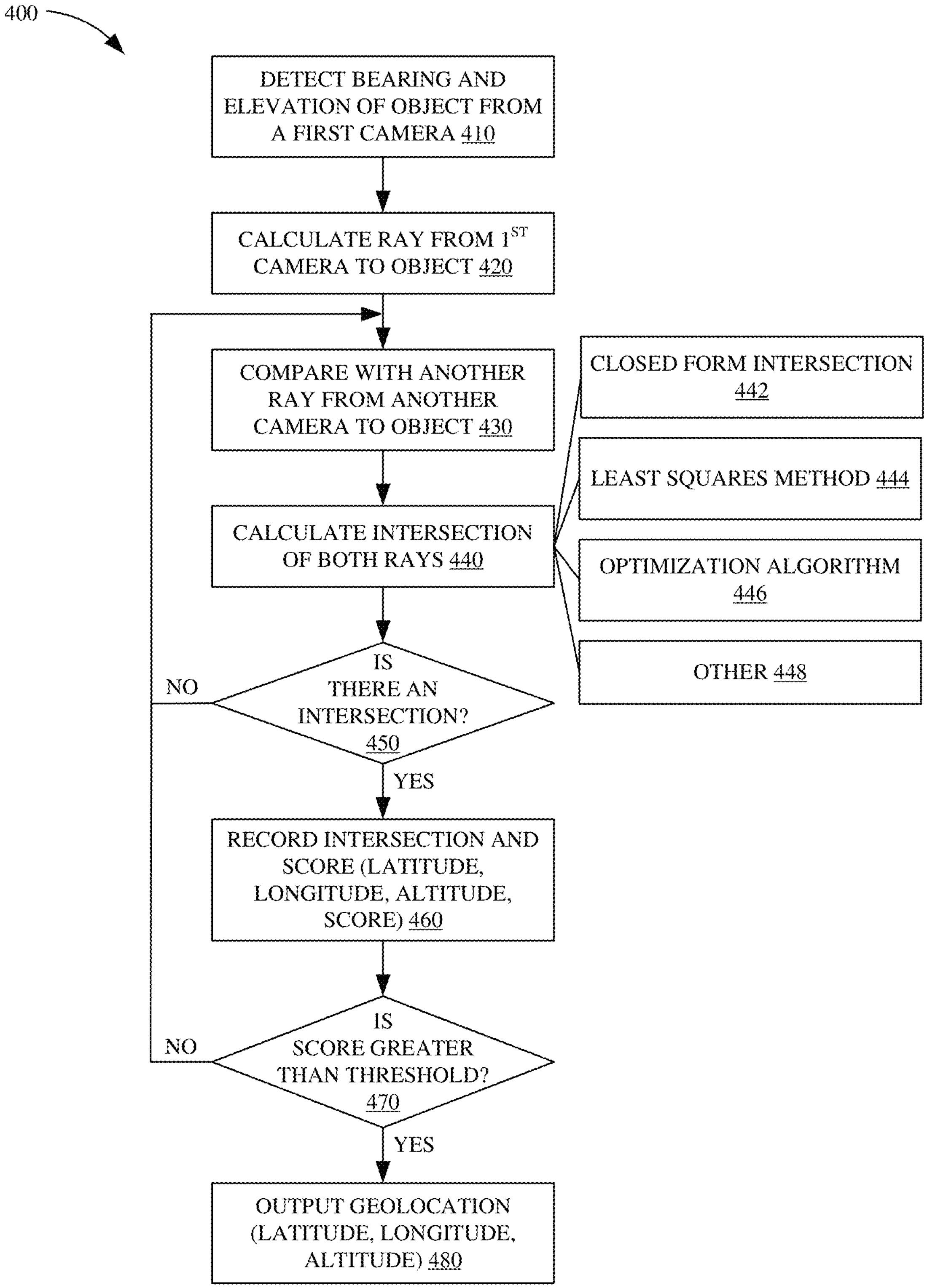
FIG. 4 is a flow diagram showing an example object location determination in accordance with an embodiment of the present invention.

FIG. 4 is a flow diagram showing an example object location determination in accordance with an embodiment of the present invention. Method 400 may be used, for example, in conjunction with the system illustrated in FIG. 2. However, method 400 may also be used in accordance with other suitable methods and systems. Method 400 can be repeated as many times as necessary to identify all objects in all images from all cameras in a surveillance system. However, the operation will be explained with reference to the first object in the first camera in the system.

The operation begins at block 410 where a bearing and elevation of a target object is detected from a first camera. Detection can include, for example, identifying a set of pixels in the image that correspond to a bearing and elevation relative to the camera's location and field of view. Method 400 proceeds at block 420 with a ray being calculated from the first camera to the target object. In block 430, the ray from the first camera to the object is compared with one or more rays from a second (or additional) camera that may correspond to the same target object.

As shown in blocks 440 and 450, an intersection of the rays from the first camera and second (or another) camera is calculated. Specifically, an iterative calculation is conducted until an intersection of the rays between the first camera and second (or another) camera occurs. As further detailed below, the iterative calculation may include, for example, a closed form intersection 442, least-squares method 444, optimization algorithm 446, or other method 448. If there is not an intersection, then the first ray is compared with a different ray (e.g., a ray of the second camera or from another camera). If there is an intersection, then the intersection is recorded and scored (e.g., latitude, longitude, altitude and score) as shown in block 460. Scoring may include, for example, degree of certainty and/or margin of error. In one embodiment, scoring is based on the margin of error estimated by error ellipses, such as those discussed above with respect to FIG. 3.

In blocks 470 and 480, the score is compared against a predetermined threshold. If the score meets the conditions of the threshold, then the geolocation is outputted as one or more geographical parameters. For example, the geolocation may be outputted as a latitude, longitude, and altitude. If the score does not meet the conditions of the threshold, another iterative calculation is conducted where the operation proceeds back again to block 430 and the first ray from the first camera is compared with a different ray from the second (or another) camera, potentially revealing a different intersection with the first ray from the first camera. Additionally, if the ray has a more desirable score for another target object, the current score may, in one embodiment, be discarded and the process can proceed backwards again, where rays are compared as in block 430. In this way, the rays from multiple cameras that best match the object are used for geolocation. In one example, the score may be a Z score, where a smaller Z score from the predetermined threshold indicates a greater likelihood that the rays have intersected, and the corresponding objects represent the same object.

Figure 5A:
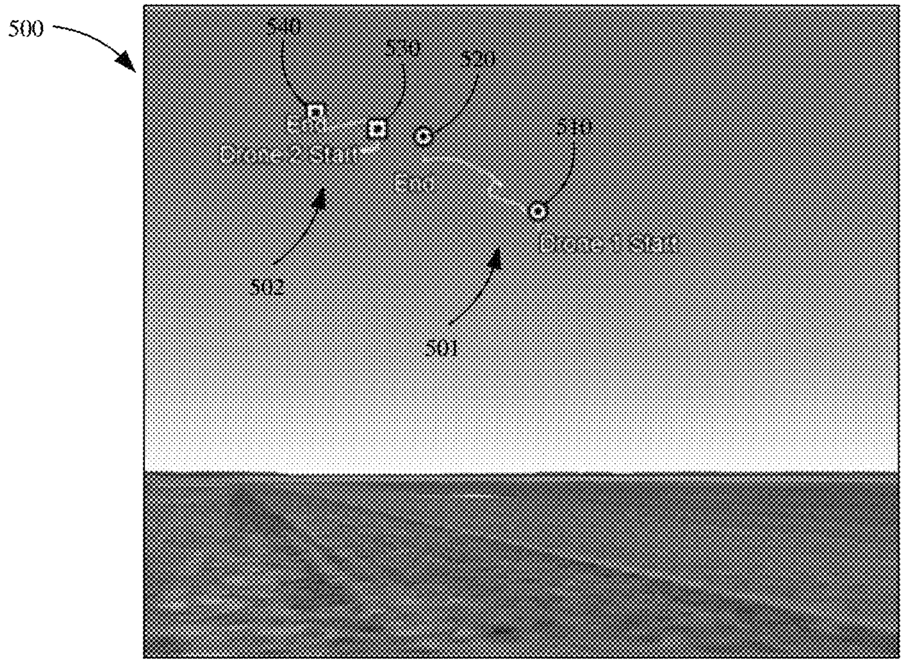
FIG. 5A is a three-dimensional perspective image showing the location of one or more drones over time in accordance with an embodiment of the present invention.
Figure 5B:
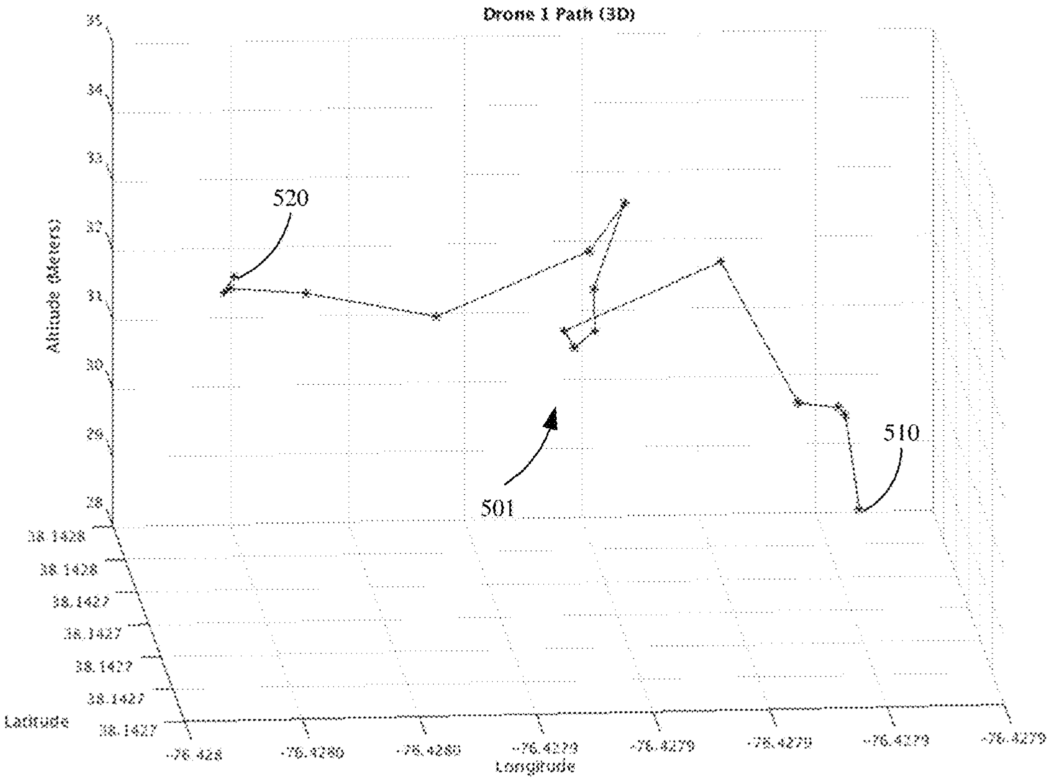
FIG. 5B is a three-dimensional graph showing the location of a drone over time in accordance with an embodiment of the present invention.

FIG. 5A is a three-dimensional perspective image showing the location of one or more drones over time in accordance with an embodiment of the present invention. FIG. 5B is a three-dimensional graph showing the location of the drone over time in accordance with an embodiment of the present invention. FIG. 5B bears some similarities to FIG. 5A, and like components are numbered similarly. Both, FIGS. 5A and 5B can be displayed as part of an interface to a user on display, such as display device 1102 described above with respect to FIG. 2. In some examples, both the point of view image and the three-dimensional graph can be displayed at the same time. Image 500 includes two drones having separate paths 501 and 502. As shown, both drone paths 501 and 502 have marked start points 510 and 530 and end points 520 and 540. The separate paths 501 and 502 of the drones are tracked in the camera image (e.g., showing a line of the past path of the drones and points at different times). Paths 501 and 502 can be updated as the drone continues movement over time. Further, in some examples, direction of the drone and/or drone paths, drone velocity and/or heading, and other directional indicators of interest may be updated and displayed on the display device. In one embodiment, the camera image is a video feed (live or pre-captured). In another embodiment, paths 501 and 502 may be displayed on a 3D map such as the Google Earth service (available from Google LLC, with headquarters in Mountain View, Calif. 94043).

As shown in FIG. 5B the location estimates of drone path 501 based on the camera image (and another camera image) is mapped on a three-dimensional chart corresponding to a geographic area proximate the cameras. Additionally, in some examples, a margin of error may be displayed on FIG. 5A and/or FIG. 5B. The margin of error may be, for example, displayed as an error ellipse.

Figure 6:
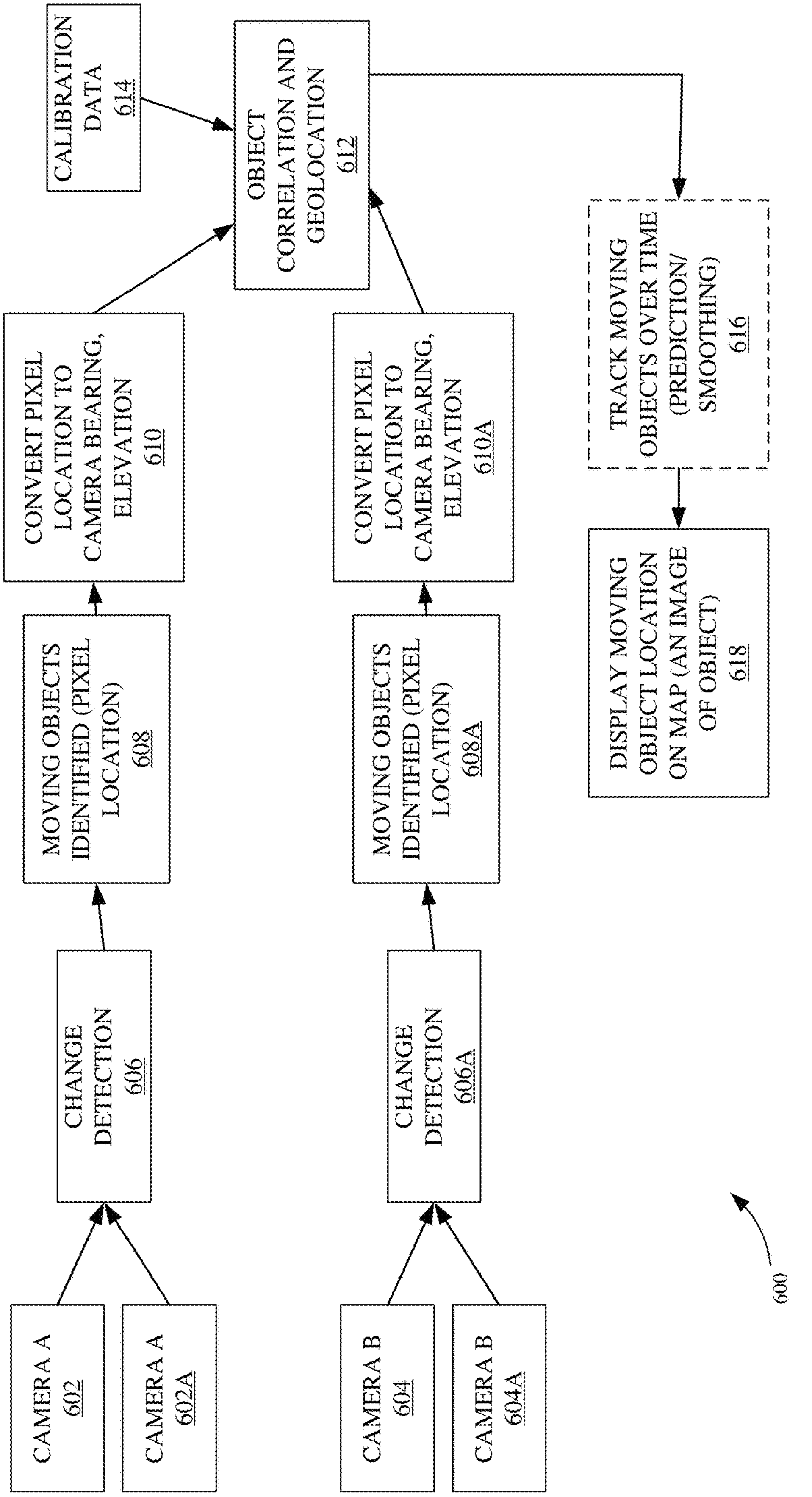
FIG. 6 is a block diagram showing an example object detecting, tracking and mapping system in accordance with an embodiment of the present invention.

FIG. 6 is a block diagram showing an example object detecting, tracking and mapping system in accordance with an embodiment of the present invention. As described above, system 600 is configured to gather images from multiple cameras and identify a detected change in the stream of images. System 600 illustratively includes camera images 602 and 604. Additionally, system 600 includes camera images 602A and 604A, forming two separate camera image sets (illustrated as A and B, respectively). In other embodiments, additional camera images may be incorporated into any camera image set, or a new camera image set may be added altogether. In one example, camera images 602, 602A, 604, and 604A are images from broad-range video cameras. However, it is expressly contemplated that other cameras capable of image change detection may be used as well. The cameras corresponding to camera images 602 (602A) and 604 (604A) may be time synchronized, in which they are synchronized to take pictures at the same time and geolocate detected objects within a single frame.

Alternatively, the cameras may not be time synchronized and can geolocate target objects over a period of time.

In blocks 606 and 606A, image change detection occurs from the stream of images 602 (602A) and 604 (604A). Image change detection may occur, for example, by moving object detection logic 1004 described above. In one embodiment, image change detection includes detecting image change by pixel differences between sequentially captured images, indicative of one or more moving objects in the camera's overlapping field of view. The pixelated change in the image(s) can be determined to be one or more moving objects moving through the overlapping field of view of the cameras in the surveillance environment. Additionally, while some embodiments of FIG. 6 are discussed with respect to detecting one target moving object, it is expressly contemplated that multiple moving objects may be simultaneously detected and geolocated by system 600.

Next, in blocks 608 and 608A, the moving objects detected by image changes are identified. Identification may occur, for example, by moving object detection logic 1004 and object mapping logic 1010. As illustrated in FIG. 6, identification includes determining the pixel location of the detected moving object. The pixel location may include, for example, the x and y coordinates of the detected pixel change captured by, respectively, camera image sets A and B. However, in other embodiments, other positional parameters may be identified as well.

Once the object is identified, its pixel location is converted into a bearing and elevation relative to camera images 602 (602A) and 604 (604A), as shown in blocks 610 and 610A. The pixel location may be converted to bearing and elevation by, for example, object mapping logic 1010 described above. As shown in FIG. 6, bearing and elevation are represented respectively for camera image sets A and B by (βA, εA) and (βB, εB). In block 612, the bearing and elevation of camera images 602 (602A) and 604 (604A) are both incorporated to correlate and geolocate the target moving object. Object geolocation can occur, for example, by object mapping logic 1010. As illustrated in FIG. 6 and further detailed below with respect to FIG. 7, calibration data 614 may be received relative to camera images 602 (602A) and 604 (604A) and incorporated with the bearing and elevation from blocks 610 and 610A, and each pixel may be identified as an angular and/or distal location relative to the camera(s). In this way, the detected pixel change and pixel location of the object in the image (or sets of images from multiple cameras) can be converted into a geolocation (e.g., latitude, longitude, altitude, etc.) of the object. Calibration data may include, for example, the latitude, longitude, and altitude of the camera and/or other landmarks within the surveillance environment. Based on the size of the object in the image, or the overlapping of multiple geolocation estimations from the different cameras, the absolute geolocation of the object may be determined.

In block 616, the target moving object(s) may be optionally tracked over time. In some examples, the object's future locations are predicted, for example by object prediction logic 1014. Additionally, in some examples the objects motion and/or travel path is smoothed. Finally, in block 618, the object(s) is/are displayed on a display device, such as display device 1102. In one embodiment, an indication of the object is displayed on a 2D and/or 3D map representation of an area proximate the cameras. Additionally, in another embodiment, the target object(s) may be highlighted, and/or a box may be created about the object image such that it is emphasized to the user. Further, in some examples, the margin of error (e.g., error ellipses) may also be displayed about the object indication (e.g., on the map), as discussed above.

System 600 is capable of operation in any suitable computing environment. For example, the architecture can be constructed on a wide variety of different devices, including desktop computers, laptop computers, tablet computers, mobile devices, or any other capable computing environment.

Figure 7:
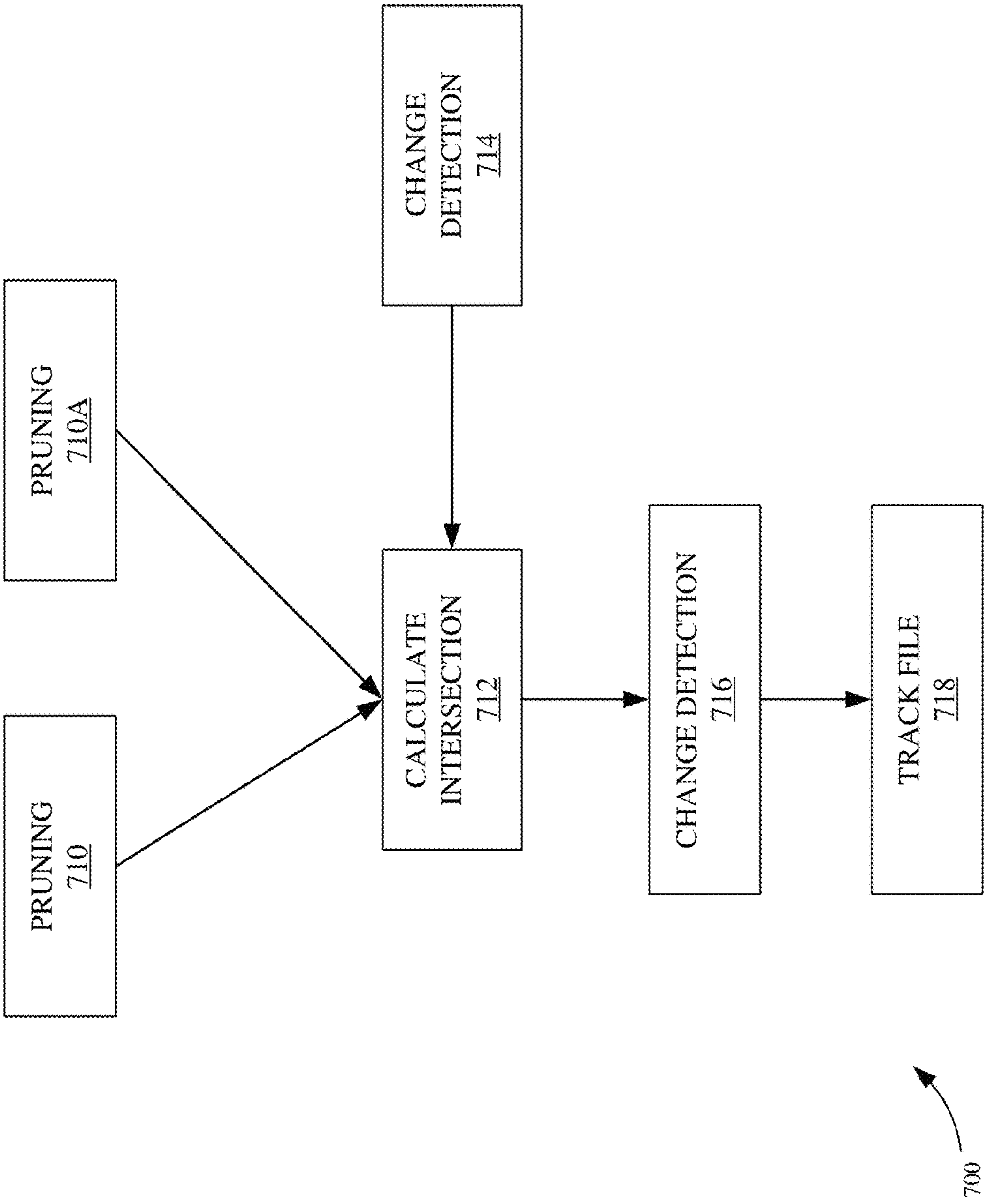
FIG. 7 is a block diagram showing an example object correlation and geolocation system in accordance with an embodiment of the present invention.

FIG. 7 is a block diagram showing an example object correlation and geolocation system in accordance with an embodiment of the present invention. The object correlation and geolocation system may be, for example, the system described in block 612 with respect to FIG. 6. System 700 begins with a calculated bearing and elevation angle for two camera sets being pruned. The camera sets may be, for example, camera sets A and B corresponding to cameras 602 (602A) and 604 (604A), as described above. Pruning 710 and 710A includes discarding objects that are known to be present in the fields of view of the various cameras, and/or objects that do not meet certain criteria. Additionally, pruning may include object identification. For example, machine learning could be used to identify which objects are of interest (e.g., a UAV) and forward only the objects of interests for geolocation estimation.

Pruning may include a max range check, wherein the target object is checked to see if it is within max range of each camera within the surveillance environment. If the target object is not within max range, then the object is pruned. In one embodiment, the max range check is determined by analyzing the closed form solution of the target object, which refers to calculating the geolocation of the object with the assumption that the object is on the surface of the Earth.

In another embodiment, pruning may include a field of view (FOV) check. The FOV check may be completed, for example, by calculating the closed form solution of a target object based on the FOV of one camera and converting the locational coordinates to x-y pixel coordinates to compare with another camera having an overlapping FOV with the first camera. If a match is found (with and/or without the camera's error range), the check is passed. When a match is not found, the target object fails the FOV check and may be discarded.

Alternatively, or additionally, pruning may include a size check of the target object(s). For example, if the object in question is too large or too small to be the target object, it may be discarded. In one embodiment, the size check includes determining the size of the object in pixel space (e.g., x-y pixel coordinates) and comparing it to a reference size.

In another embodiment, pruning may include a region of interest (ROI) check. The ROI check may include setting x-y pixel coordinate limits on the camera's overlapping FOV. For example, if a specific region is not of particular interest in a surveillance environment, the pruning step may discard any objects within the parameters of that specific region. Additionally, the ROI check may include checking the camera's overlapping FOV and discarding any objects within the non-overlapping parts of each camera's FOV. Of course, the target object(s) can be pruned in other ways as well.

In block 712, an intersection of the rays of each camera is calculated, which correlates target object(s) from one camera to another to produce one or more geolocation estimates. As indicated by block 712, calculating the intersection includes looping through each target object such that an intersection is calculated for each object. In this way, multiple objects may be simultaneously detected and geolocated based on their calculated intersection. Additionally, calculating the intersection may optionally include providing calibration data to be used in the calculation, as indicated by block 714. The calibration data 714 may be received relative to the cameras in the surveillance environment and incorporated with the bearing and elevation from blocks 710 and 710A. Calibration data may include, for example, the latitude, longitude, and altitude of the camera and/or other landmarks within the surveillance environment. Additionally, calibration data may be data from a calibration object within the surveillance environment, such as a vehicle, operator, or UAV with a global positioning system (GPS).

The intersection of the rays of each camera corresponding to the target object(s) may be calculated in a number of ways. For example, calculating the intersection may comprise calculating the closed form intersection, in which the intersection of rays is calculated with the assumption that the target object(s) is/are on the surface. In another embodiment, calculating the intersection may comprise calculating the nearest point to non-intersecting lines from each camera using, for example, the least-squares method.

In another embodiment, calculating the intersection may comprise running an optimization algorithm iteratively. The optimization algorithm may be, for example, the least-squares method, Newton search, or any other optimization algorithm sufficient for determining the intersection relative to the cameras. In one example, the optimization algorithm may include calculating the locational coordinates (e.g., latitude and longitude) of one or more detected objects assuming the object is on the ground. In this way, altitude is assumed to be zero and the object is assumed to be projected onto the ground plane. Then, an average of the locational coordinates relative to each camera can be calculated and used as a starting point. Once the average locational coordinates are calculated, the Newton algorithm may be iteratively applied to each camera to determine the geolocation estimate for each target object.

In some examples, calculating the intersection includes producing a confidence metric on the estimated geolocation of the target object(s), the confidence metric being indicative of the relative accuracy and/or confidence level of the estimated geolocation. The confidence metric may be, for example, a score to be compared to some threshold. In one embodiment, the confidence metric is a Z value comprising a chi squared random variable (wherein the lower Z value correlates to a more accurate geolocation). Once the intersection is calculated, an output is computed and outputted for the target object(s) that resolved to a solution in the intersection calculation. The output may include, for example, the locational coordinates (e.g., latitude, longitude, and/or altitude) and/or one or more confidence metrics.

In block 716, reconciliation occurs based on the calculated intersections for each target object. Reconciliation may be defined as the process of keeping the best calculated intersections and discarding the remainders. If the calculated intersection step records multiple matches between a given ray and other rays, reconciliation can be used to reduce the number of solutions to find the optimal match. Reconciliation may occur, for example, based on the calculated confidence metrics in block 712. For example, the confidence metric may be compared to a predetermined threshold. If the threshold is not met, the intersection may be discarded. Additionally, reconciliation may include eliminating any duplicate intersection calculations based on the same target object(s). Following reconciliation, the remaining outputs are outputted to a track file, as indicated by block 718. The outputs may include, for example, the latitude, longitude, altitude, confidence metric, and x-y pixel coordinates for each respective target object. The track file may be published, for example, as a KML file or any other format suitable for displaying the outputted geolocation estimate.

By way of example, and not by limitation, an exemplary description of calculating the geolocation of a detected moving object is produced below:

Given an object (objectA), a location [xA, yA] in the view of a camera (cameraA) at location camA_lla=[camA_lat camA_lon camA_alt] and another object (objectB) at location [xB, yB] in view of another camera (cameraB) at location camB_lla=[camB_lat camB_lon camB_alt], it can be determined whether they are the same object, but from different views, using the following algorithm.

For each camera/object pair, these values are calculated. For example, for cameraA, the bearing and elevation angle to objectA are calculated, according to Equations 1 and 2. The same is done for cameraB and objectB.

$$\text{Bearing}=(x-x_{mid})*i\text{fov}+\text{cam\_bearing} \qquad \text{Equation 1}$$

Where: $x_{mid}$=middle x pixel location of the camera view ($x_{max}$/2, where $x_{max}$=the total number of pixels in the horizontal direction of the camera), ifov=instantaneous field of view of the camera (No. of degrees per pixel), and cam_bearing=bearing of the camera (at xmid).

$$\text{Elevation Angle}=\text{tilt\_vector}(x)+i\text{fov}*(y-y_{mid}) \qquad \text{Equation 2}$$

Where: tilt_vector(x)=the vector generated representing the tilt angle at the given x location for the given camera, $y_{mid}$=middle y pixel location of the camera view($y_{max}$/2, where $y_{max}$=the total number of pixels in the vertical direction of the camera).

The elevation angle and bearing corresponding to objectA and objectB are saved as "measured observables" and their values are used in an iterative Newton Algorithm step. Additionally, deviations for each of these values are also computed and saved separately (bearing_dev_A, elev_angle_dev_A, bearing_dev_B, elev_angle_dev_B). For example, they are saved as "measured observable deviations" and their values are used below with respect to Equation 5.

$$obs_{measured}=\begin{bmatrix}\text{bearing}_A\\ \text{elev\_angle}_A\\ \text{bearing}_B\\ \text{elev\_angle}_B\end{bmatrix} \qquad \text{Equation 3}$$

Before the iterative algorithm starts, a good potential starting location for the object must be calculated. A primary objective is to calculate a latitude/longitude pair that represents a single object represented by the two different views from cameraA and cameraB. If the starting location for this is too far away, it may not converge to the correct answer in a reasonable number of iterations. To do this, the latitude and longitude of objectA and objectB is calculated assuming that they are anchored to the ground (not in the air). In this example, the vincenty algorithm (a well-established geolocation algorithm) is utilized, which yields latA, lonA for objectA and latB, lonB for objectB. Following this, the locations are averaged to calculate the starting location. Of course, it is expressly contemplated that other methods may be utilized to calculate the starting location as well.

$$[\text{starting\_lat},\text{starting\_lon}]=[(\text{lat}A+\text{lat}B)/2,(\text{lon}A+\text{lon}B)/2] \qquad \text{Equation 4}$$

Then, the altitude at [starting_lat, starting_lon] is found by sampling an elevation database. [Starting_lat; starting_lon; starting_alt] will be the first "current estimate" (current_estimate_lla) used in the Newton algorithm.

In the Newton algorithm, the weighting matrix is used to update the error variance, or Z score, which is used to determine whether objectA and objectB represent the same object, described above. The values are set forth below in Equation 5 as follows:

$$W = \begin{bmatrix} \frac{1}{(\text{bearing\_dev\_A})^2} & 0 & 0 & 0 \\ 0 & \frac{1}{(\text{elev\_angle\_dev\_A})^2} & 0 & 0 \\ 0 & 0 & \frac{1}{(\text{bearing\_dev\_B})^2} & 0 \\ 0 & 0 & 0 & \frac{1}{(\text{elev\_angle\_dev\_B})^2} \end{bmatrix} \quad \text{Equation 5}$$

Then, the iterative process begins, in which a Newton Algorithm is utilized in order to decide if the objects are the same. One iteration includes calculating the Jacobian Matrix J and estimating for A & B using the current estimate. The current estimate may be, for example, the estimated bearing and elevation angle using the current latitude/longitude/altitude estimate. Then, Error Y is calculated in the iteration by subtracting estimate values of the bearing and elevation angles from the measured values calculated utilizing the equations above. The error is calculated for both estimate A and estimate B, and then adjusted to make sure it is within [0,360) degrees. Following this, the Z score is calculated, which is a measure of the variance of the estimate. As noted above, if the Z score is very small, this indicates that the rays have intersected and objectA and objectB represent the same object. Then, the current estimate is updated, and the process repeats for a number of iterations. The equations utilized in the Newton Algorithm are set forth below:

$$[J_A, \text{bearing\_est}_A, \text{elev\_angle\_est}_A] = \text{Jacobian(current\_estimate\_lla, camA\_lla)} \quad \text{Equation 6}$$

$$[J_B, \text{bearing\_est}_B, \text{elev\_angle\_est}_B] = \text{Jacobian(current\_estimate\_lla, camB\_lla)} \quad \text{Equation 7}$$

$$obs_{estimate} = \begin{bmatrix} \text{bearing\_est}_A \\ \text{elev\_angle\_est}_A \\ \text{bearing\_est}_B \\ \text{elev\_angle\_est}_B \end{bmatrix} \quad \text{Equation 8}$$

$$J = \begin{bmatrix} J_A \\ J_B \end{bmatrix} \quad \text{Equation 9}$$

$$obs_{error} = Y = obs_{measured} - obs_{estimate} \quad \text{Equation 10}$$

$$Z = \sqrt{\frac{Y^T * W * Y}{3}} \quad \text{Equation 11}$$

$$\text{update} = (J^T W J)^{-1} J^T W Y \quad \text{Equation 12}$$

$$\text{current\_estimate\_lla} = \text{current\_estimate\_lla} + 0.5 * \text{update} \quad \text{Equation 13}$$

By way of example, and not by limitation, an exemplary calculation of the geolocation of a detected moving object is produced below:

CamA_lla=[38.1445°, −76.43383°, 9.612067 m]

CamA_bearing=104.762°

CamA_ifov=0.002142 objectA=[23880, 148]

CamB_lla=[38.1476°, −76.4260°, 12.4324 m]

CamB_bearing=186.8015°

CamB_ifov=0.002197 objectB=[26201, 399]

$x_{mid}$=20828

$y_{mid}$=928

$\text{bearing}_A$=(23880−20828)*0.002142+104.762=111.2994°

$\text{elev\_angle}_A$=tilt_vector(23880)+(148−928)*0.002142=−2.7245° bearing_dev_A=0.0617 elev_angle_dev_A=0.0394

$\text{bearing}_B$=(26201−20828)*0.002197+186.8015=198.6060°

$\text{elev\_angle}_B$=tilt_vector(26201)+(399-928)*0.002197=−2.2451° bearing_dev_B=0.4445 elev_angle_dev_B=0.0462

$$obs_{measured} = \begin{bmatrix} 111.2994 \\ -2.7245 \\ 198.6060 \\ -2.2451 \end{bmatrix}$$

After running vincenty algorithm: [latA, lonA]=[38.1412, −76.4232]

[latB, lonB]=[38.1391, −76.4296]

[starting_lat, starting_lon]=[(latA+latB)/2, (lonA+lonB)/2].

[starting_lat, starting_lon]=[(38.1412+38.1391)/2, (−76.4232−76.4296)/2]

[starting_lat, starting_lon]=[38.1402, −76.4265]

Sampling altitude database at this point: altitude=4.6944 m $$\text{current\_estimate\_lla} = \begin{bmatrix} 38.1402 \\ -76.4265 \\ 4.6944 \end{bmatrix}$$

$$W = \begin{bmatrix} \frac{1}{(0.0617)^2} & 0 & 0 & 0 \\ 0 & \frac{1}{(0.0394)^2} & 0 & 0 \\ 0 & 0 & \frac{1}{(0.445)^2} & 0 \\ 0 & 0 & 0 & \frac{1}{(0.0462)^2} \end{bmatrix}$$

-continued $$W = \begin{bmatrix} 262.7813 & 0 & 0 & 0 \\ 0 & 643.863 & 0 & 0 \\ 0 & 0 & 5.0623 & 0 \\ 0 & 0 & 0 & 468.7622 \end{bmatrix}$$

$$[J_A, 126.4854, 0.3514] = \text{Jacobian(current\_estimate\_lla\_camA\_lla)}$$

$$J_A = \begin{bmatrix} -6310.6 & -3686.6 & 1.7*10^{-8} \\ 28.0322 & -29.9331 & -0.0707 \end{bmatrix}$$

$$[J_B, -177.3226, 0.5378] = \text{Jacobian(current\_estimate\_lla\_camB\_lla)}$$

$$J_B = \begin{bmatrix} 357.8343 & -6044 & 1.74*10^{-9} \\ 70.8285 & 2.615 & -0.069 \end{bmatrix}$$

$$obs_{estimate} = \begin{bmatrix} 126.4854 \\ 0.3514 \\ -177.3226 \\ 0.5378 \end{bmatrix}$$

$$J = \begin{bmatrix} -6310.6 & -3686.6 & 1.7*10^{-8} \\ 28.0322 & -29.9331 & -0.0707 \\ 357.8343 & -6044 & 1.74*10^{-9} \\ 70.8285 & 2.615 & -0.069 \end{bmatrix}$$

$$obs_{error} = Y = obs_{measured} - obs_{estimate}$$

$$Y = \begin{bmatrix} 111.2994 \\ -2.7245 \\ 198.6060 \\ -2.2451 \end{bmatrix} - \begin{bmatrix} 126.4854 \\ 0.3514 \\ -177.3226 \\ 0.5378 \end{bmatrix} = \begin{bmatrix} 344.814 \\ 356.9241 \\ 15.9286 \\ 357.2171 \end{bmatrix}$$

$$Z = \sqrt{\frac{Y^T * W * Y}{3}} = 154.4969$$

$$\text{update} = (J^T WJ)^{-1} J^T WY = \begin{bmatrix} 0.003813 \\ -0.002408 \\ 45.2587 \end{bmatrix}$$

$$\text{current\_estimate\_lla} = \begin{bmatrix} 38.1402 \\ -76.4265 \\ 4.6944 \end{bmatrix} + 0.5 * \begin{bmatrix} 0.003813 \\ -0.002408 \\ 45.2587 \end{bmatrix}$$

$$\text{current\_estimate\_lla} = \begin{bmatrix} 38.1421 \\ -76.4276 \\ 27.3238 \end{bmatrix}$$

The above process is then repeated N times, recording the Z score each time. As previously indicated, if the Z score is very small, this indicates that the rays have intersected and the objects in question represent the same object. In the present example, the final Z score is less than 0.5, and a match has been successfully found. The resulting estimate latitude/longitude/altitude is therefore:

$$\text{final\_estimate\_lla} = \begin{bmatrix} 38.1427 \\ -76.4281 \\ 35.2799 \end{bmatrix}$$

Although the above example utilizes a specific set of optimization algorithms, it is expressly contemplated that any other optimization algorithm may be used to estimate the geolocation of one or more target objects.

Figure 8:
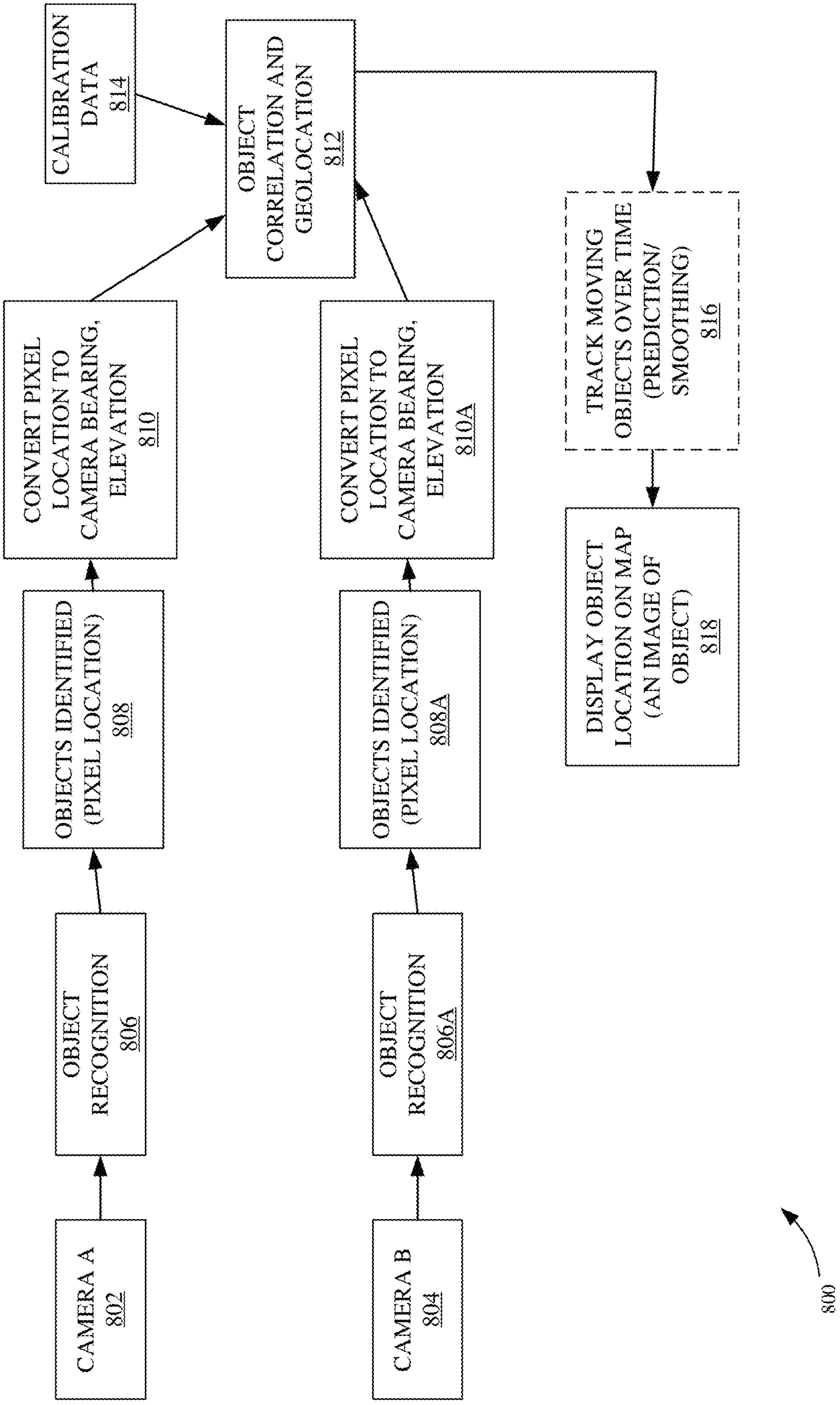
FIG. 8 is a block diagram showing an example object detecting, tracking and mapping system in accordance with another embodiment of the present invention.

FIG. 8 is a block diagram showing an example object detecting, tracking and mapping system in accordance with another embodiment of the present invention. FIG. 8 bears some similarities to FIG. 6 and like components are numbered similarly. The principal distinction between system 800 and system 600 is that system 800 implements object recognition as shown in block 806 and 806A. In particular, object detection may occur with image recognition techniques. This is particularly useful for instantaneous geolocation of stationary objects. In one embodiment, object recognition occurs by machine learning, in which data relative to the environment being surveyed by cameras 802 and 804 is implemented to recognize stationary objects and determine their location. In another embodiment, manual user intervention can occur, in which the operator selects a target object in the camera's overlapping field of view to determine its geolocation. Once the object is recognized as in blocks 806 and 806A, the operation proceeds similarly to that of system 600, described above.

Figure 9:
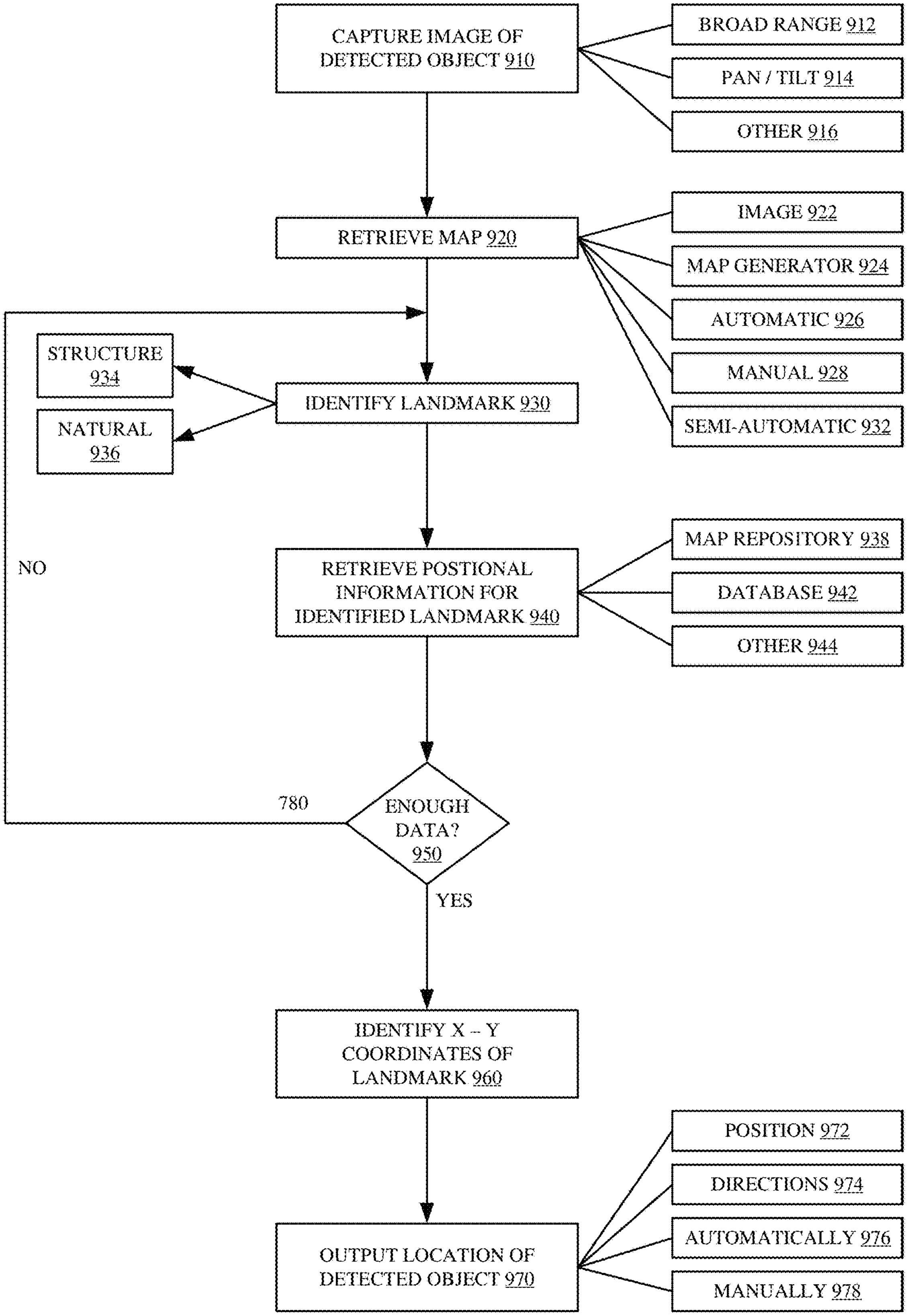
FIG. 9 is a flow diagram showing an example operation of detecting and displaying location information for an object in accordance with an embodiment of the present invention.

FIG. 9 is a flow diagram showing an example operation of detecting and displaying location information for an object in accordance with an embodiment of the present invention. In block 910, an image containing a detected object is captured. The image may be captured by a broad-range video camera, as indicated in block 912, a pan/tilt camera as indicated in block 914, or another suitable camera as indicated in block 916. Detecting an object within an image may, in one embodiment, comprise a processor identifying, based on analysis of sequential images, that an object is present within a field of view of a camera.

In block 920, a suitable map is retrieved. A map image 922 can be retrieved of the camera and its surrounding landscape. For example, a map image 922 may comprise a satellite image, or other aerial view stored in a database. In another embodiment, retrieving a map can also comprise retrieving a map from a map generator service, as indicated in block 924. In one embodiment, a map is retrieved automatically 926 based on a detected object identified within a captured image. However, in another embodiment, a map is not retrieved until a user indicates that location information for a detected object is desired, as indicated in block 928. Additionally, retrieving a map can be conducted semi-automatically, as indicated in block 932. For example, a map may be retrieved based on a known camera image but may not be displayed until selected by a user.

In block 930, a landmark or an object with a known location is identified within the field of view of a camera. The landmark may be a structural landmark, as indicated in block 934, for example a manmade structure. In another embodiment, the identified landmark can be a natural structure, as indicated in block 936, such as a lake, a river, etc. An object with a known location could include an object with a GPS device (e.g., a vehicle, a person, etc.).

In block 940, positional information is retrieved for an identified landmark. Retrieving positional information can comprise consulting a map repository, as indicated in block 938, retrieving information from a database, as indicated in block 942, or using another information source, as indicated in block 944. For example, a map generation service, such as Google Maps, may already have information for identifiable landmarks within the map, such that positional information can be retrieved by requesting it from the map repository directly. In an embodiment where a satellite or other aerial image is retrieved, known landmark information may be stored within a database, for example based on geological surveys, or known locations of landmarks. Additionally, other sources of positional information are also envisioned herein. In some examples, blocks 930 and 940 are not necessary. For example, blocks 930 and 940 may not be necessary if a position and angle of the camera are known.

As indicated in block 950, if enough data is present to map the pixels of the camera image to a latitude and longitude, the method may proceed to block 960. However, in most embodiments, blocks 930 and 940 will have to be iterated multiple times, as indicated by return arrow 980. In one embodiment, four landmarks must be identified and located, in order for x-y coordinates to be available for each pixel of a camera image. However, in other embodiments, fewer landmarks may be necessary, for example only two or three, or more landmark information may be necessary, for example five or more.

In block 960, x-y coordinates are identified of the landmarks within the image, and, using the x-y coordinates of the landmarks, and the known positional information of the identified landmarks, x-y coordinates of pixels throughout the image can be mapped to positional information, for example latitude and longitude information can be obtained for each pixel within the camera image. In one embodiment, the calibration step of block 960 is conducted when a camera is installed in a location and an initial field of view is identified. In another embodiment, the calibration step only occurs once an object is detected.

In block 970, a location of a detected object is output, for example to a display, or as another suitable output format. For example, a position of the object, as indicated in block 972, can be presented to a user. The position may comprise a latitude-longitude of the identified object. Additionally, in one embodiment, directions to the detected object are provided, as indicated in block 974. The directions may be provided from the location of the camera or based on a known location of a patrol unit that will be sent to investigate the object.

The output can be made automatically, as indicated in block 976, for example based on initial detection of an object, method 900 may automatically engage such that a location is output automatically without any user interaction. However, in other embodiments, the location is output at least semi-manually, as indicated in block 978. For example, method 900 may not engage until a user has actuated an indication of a detected object on a user interface, and requested a location. Based on such a user request, method 900 may be engaged, and the location of the detected object may be output. In at least some embodiments, for each detected object of interest, method 900 is engaged periodically in order to track the movement of the object over time.

Figure 10A:
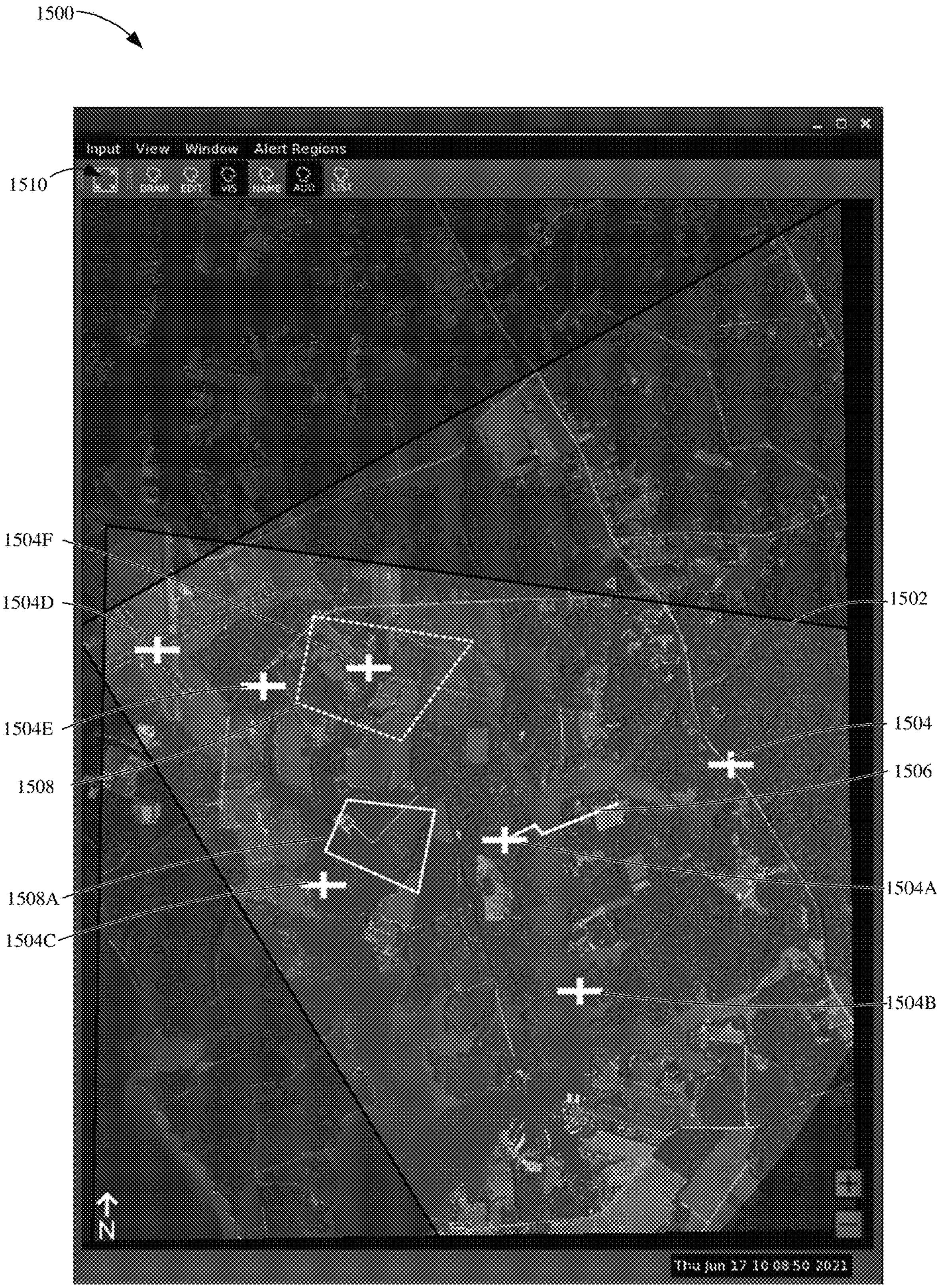
FIGS. 10A-10D show examples of display interfaces which may be used in the architectures shown in the previous figures.

FIGS. 10A-10D show examples of display interfaces which may be used in the architectures shown in the previous figures. The interfaces provided in FIGS. 10A-10D may be provided individually on a display, or all displayed simultaneously. FIG. 10A, for example, shows an interface in which a top-down map view of a surveillance environment is displayed. Specifically, interface 1500 shows overlapping field of view 1502 from a first and second camera, which is highlighted on the map view. A moving object being within overlapping field of view 1502 allows for it to be geolocated based on the pixel changes from sequentially captured images by the first and second camera, indicative of the moving object within overlapping field of view 1502. Geolocation can include, in one example, a latitude, a longitude, and elevation/altitude. Interface 1500 further includes detected objects 1504-1504F, which are indicated by crosses in this example. In other examples, detected objects may be marked in other manners, such as by highlighting, circling, or other manner of marking detected objects 1504-1504F. In some embodiments, moving objects 1504-1504F may be moving objects, and the movement path for each moving object may be displayed on interface 1500, as shown at reference numeral 1506. Additionally, in some examples, interface 1500 may display restricted flying zones 1508-1508A. Based upon the detection and geolocation of object 1504F being in restricted flying zone 1508, an alarm can be triggered to a user of the surveillance system. In some examples, the alarm can include audible, visual and/or haptic stimuli. For example, the alarm may be dashed lines of the alert region, pulsing of the moving object, automatically opening a target detail window (discussed below), etc.

Interface 1500 may be zoomed in or out, panned, and rotated. Additionally, moving a cursor around interface 1500 may optionally display the locational coordinates corresponding to the position of the cursor. In some embodiments, clicking on a detected object 1504-1504F may open an additional interface window displaying information on the particular detected object. Interface 1500 further includes interface tools 1510 which allow customization and editing by the operator.

Figure 10B:

As shown in FIG. 10B, a target detail interface is displayed, in which the images from each camera corresponding to a detected object may be simultaneously shown. In this example, interface 2000 shows detected object 2002 from the FOV of a first and second camera. Of course, in other examples, multiple FOV's from additional cameras in the surveillance environment may be optionally displayed as well. As shown in FIG. 10B, the detected object is portrayed clearly to be a drone. However, it is expressly contemplated that other moving objects may be detected and displayed on interface 2000 as well. Interface 2000 may be displayed, for example, by clicking on or otherwise activating the detected object on interface 1000, which prompts interface 2000 to display. Further, interface 2000 may be automatically displayed upon object 2002 being detected in an overlapping field of view. As shown, a box is highlighted around detected object 2002 for emphasis. However, other indicators of detected object 2002 may be utilized as well. Interface 2000 further includes location panel 2010, which displays latitude, longitude, speed, bearing, and alert region, in this example. In other examples, other locational parameters may be displayed as well (e.g., altitude). Additionally, bearing and range to detected object 2002 from a selected point may also be displayed, such as from a marker placed on the map, an incident responder, a camera position, etc.

Figure 10C:
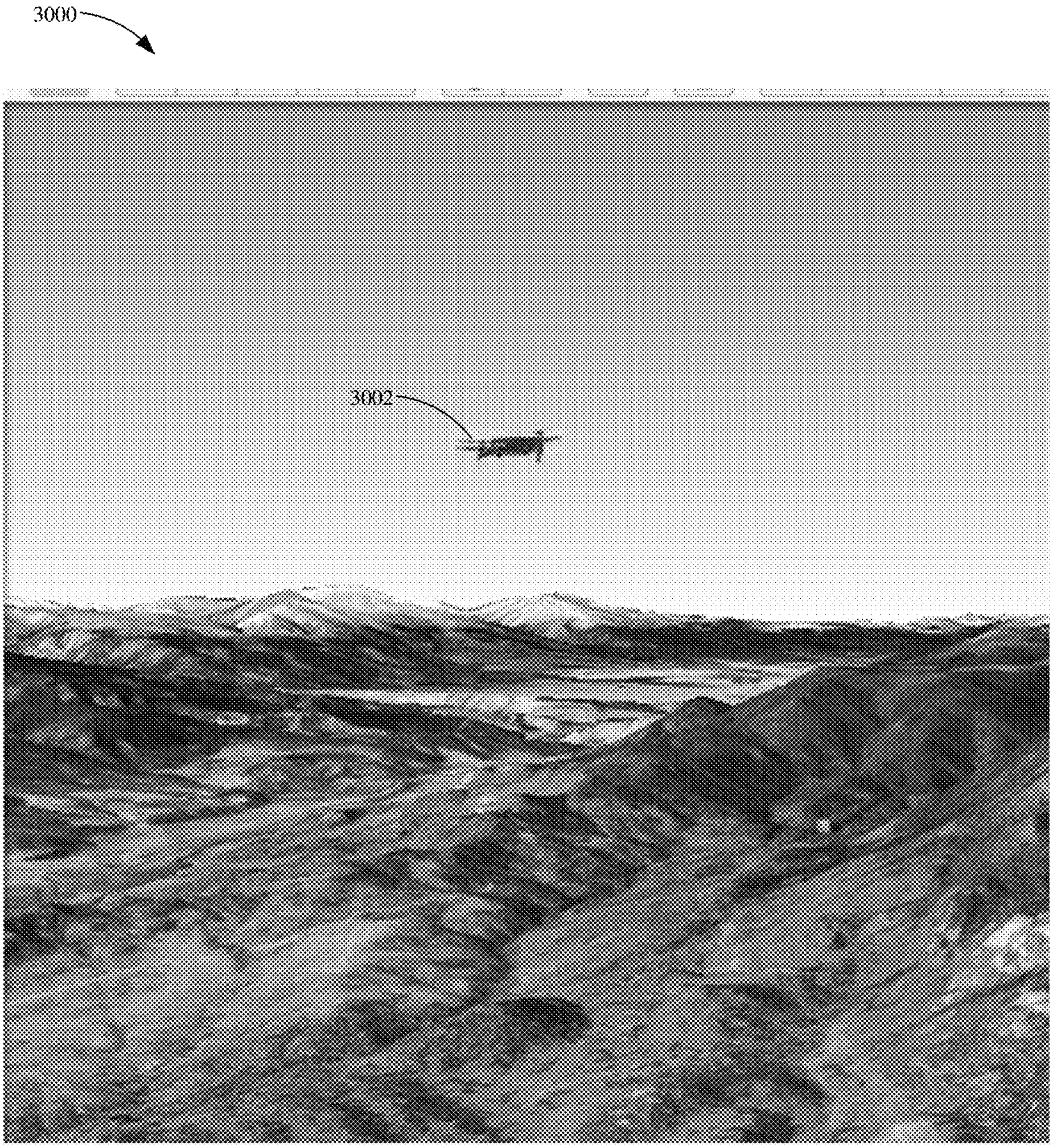

As shown in FIG. 10C, an interface is displayed in which a detected object is clearly visualized in a three-dimensional representation. In particular, interface 3000 includes detected object 3002 being displayed in a three-dimensional environment. In this example, detected object 3002 is a drone. However, it is expressly contemplated that other moving objects or stationary objects may be detected and displayed on interface 3000 as well. The view of interface 3000 may be panned, rotated, or zoomed in and out in order to get a different perspective by an operator.

Figure 10D:
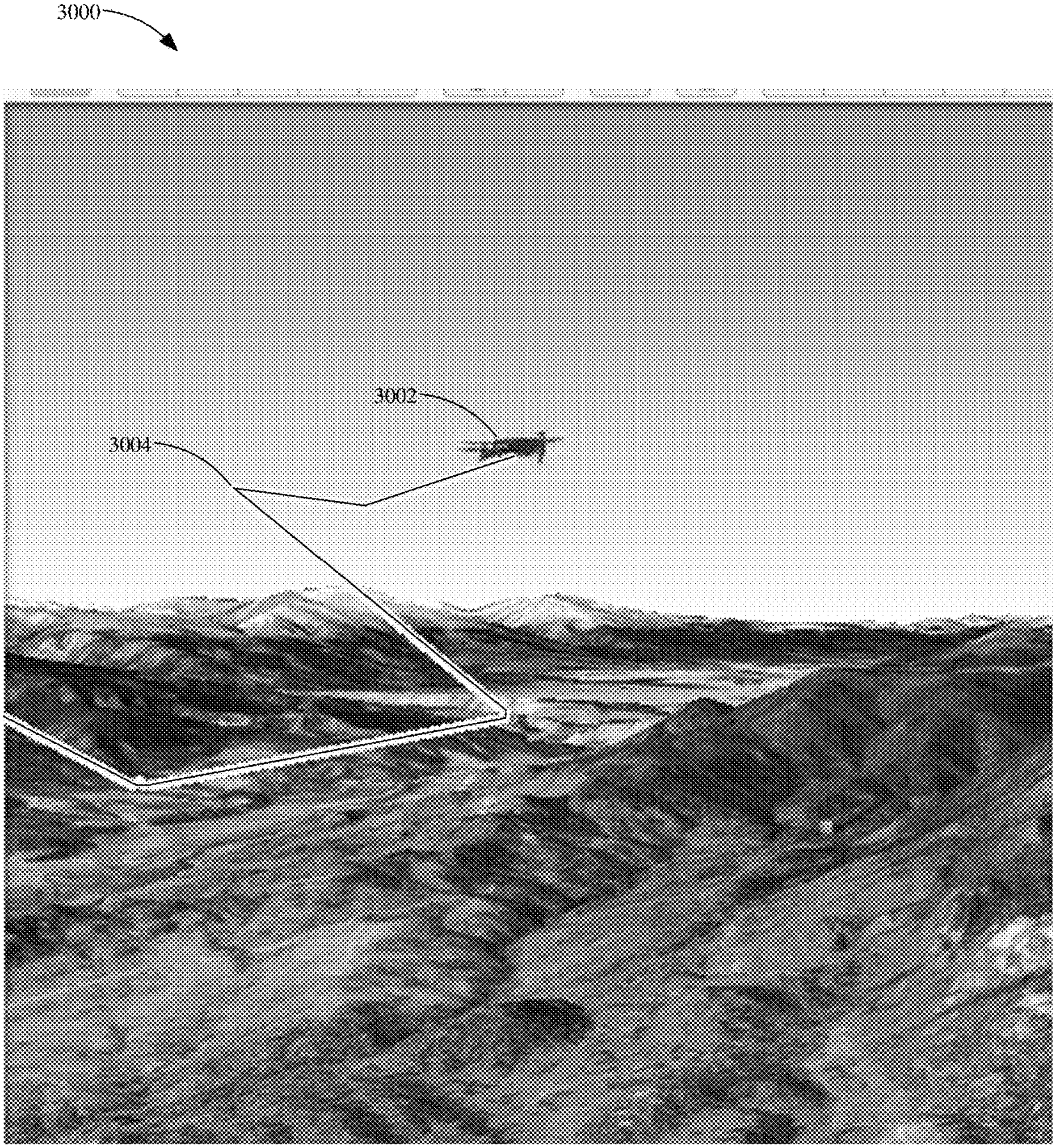

FIG. 10D bears some similarities to FIG. 10C, and like components are numbered similarly. As shown in FIG. 10D, a movement path 3004 of detected object 3002 may also be displayed to a user, which may illustrate the movement history of the detected object. In some examples, movement path 3004 may also show the predicted future movement path of detected object 3002. The view of interface 3000 may be panned, rotated, or zoomed in and out in order to get a different perspective by an operator.

Although the present invention has been described with reference to preferred embodiments, workers skilled in the art will recognize that changes may be made in form and detail without departing from the spirit and scope of the invention.

What is claimed is:

1. An object detection system comprising:

a first camera having a first field of view;

a second camera having a second field of view that overlaps with the first field of view;

object detection logic configured to receive a first image from the first camera and a second image from the second camera and identify an object in both the first and second image;

object mapping logic configured to identify a location of the object based on the first and second image;

display logic configured to display the location of the object;

wherein the display logic is configured to display the location of the object in a three-dimensional representation;

wherein the object is a moving object, and wherein the location of the moving object is represented as a movement path in the three-dimensional representation; and wherein the display logic is configured to display a location of an additional moving object, and wherein the location of the additional moving object is represented as an additional movement path in the three-dimensional representation.

2. The system of claim 1, wherein the first camera and the second camera are broad-range video cameras having a field of view of at least 90 degrees.

3. The system of claim 1, further comprising error determination logic configured to estimate an error margin for the identified location.

4. The system of claim 3, wherein the display logic displays a representation of the error margin on a display.

5. The system of claim 4, wherein the error margin is represented as a first error ellipse relative to the first camera and a second error ellipse relative to the second camera.

6. The system of claim 1, further comprising pruning logic configured to compare the object to a criterion and responsively discard the object if it does not meet the criterion.

7. The system of claim 6, wherein the criterion is an FOV check.

8. A method of determining an estimated location of at least one moving object, the method comprising:

detecting a change in a stream of images from a first camera and a second camera indicative of the at least one moving object;

identifying the at least one moving object based on the detected change in the stream of images, wherein identifying includes determining a pixel location of the at least one moving object;

calculating a bearing and an elevation of the at least one moving object based on the pixel location relative to the stream of images;

calculating an intersection of a ray from the first camera and a ray from the second camera, the intersection being indicative of the estimated location of the at least one moving object;

providing the estimated location as an output to a display device; and wherein the at least one moving object comprises a plurality of moving objects, and wherein calculating the intersection comprises looping through each moving object such that an intersection is calculated for each moving object.

9. The method of claim 8, wherein the intersection of the ray from the first camera and the ray from the second camera correlates the at least one moving object from the first camera to the second camera to indicate the location of the at least one moving object.

10. The method of claim 8, further comprising:

pruning the calculated bearing and elevation of the at least one moving object, wherein pruning includes comparing the at least one moving object to at least one criteria.

11. The method of claim 10, further comprising:

discarding the at least one moving object if it fails to meet the at least one criteria.

12. The method of claim 8, wherein calculating the intersection includes producing a confidence metric based on the calculated intersection, the confidence metric being indicative of the accuracy of the estimated location.

13. The method of claim 12, wherein providing the estimated location as an output to a display device comprises providing the estimated location and the confidence metric as an output if the confidence metric meets a threshold.

14. The method of claim 8, wherein the output of the estimated location includes a movement path of the at least one moving object.

15. The method of claim 8, wherein the output of the estimated location comprises:

a latitude and longitude pairing;

an altitude; and an error margin.

16. An object detection system comprising:

a first camera having a first field of view;

a second camera having a second field of view that overlaps with the first field of view;

object detection logic configured to receive a first image from the first camera and a second image from the second camera and identify an object in both the first and second image;

object mapping logic configured to identify a location of the object based on the first and second image;

display logic configured to display the location of the object;

error determination logic configured to estimate an error margin for the identified location; and wherein the display logic displays a representation of the error margin on a display.

17. An object detection system comprising:

a first camera having a first field of view;

a second camera having a second field of view that overlaps with the first field of view;

object detection logic configured to receive a first image from the first camera and a second image from the second camera and identify an object in both the first and second image;

object mapping logic configured to identify a location of the object based on the first and second image;

display logic configured to display the location of the object;

pruning logic configured to compare the object to an FOV check and responsively discard the object if it does not meet the FOV check.

18. A method of determining an estimated location of at least one moving object, the method comprising:

detecting a change in a stream of images from a first camera and a second camera indicative of the at least one moving object;

identifying the at least one moving object based on the detected change in the stream of images, wherein identifying includes determining a pixel location of the at least one moving object;

calculating a bearing and an elevation of the at least one moving object based on the pixel location relative to the stream of images;

calculating an intersection of a ray from the first camera and a ray from the second camera, the intersection being indicative of the estimated location of the at least one moving object;

providing the estimated location as an output to a display device; and wherein calculating the intersection includes producing a confidence metric based on the calculated intersection, the confidence metric being indicative of the accuracy of the estimated location.

19. A method of determining an estimated location of at least one moving object, the method comprising:

detecting a change in a stream of images from a first camera and a second camera indicative of the at least one moving object;

identifying the at least one moving object based on the detected change in the stream of images, wherein identifying includes determining a pixel location of the at least one moving object;

calculating a bearing and an elevation of the at least one moving object based on the pixel location relative to the stream of images;

calculating an intersection of a ray from the first camera and a ray from the second camera, the intersection being indicative of the estimated location of the at least one moving object; and pruning the calculated bearing and elevation of the at least one moving object, wherein pruning includes comparing the at least one moving object to at least one criteria, providing the estimated location as an output to a display device.

* * * * *